Patented Feb. 13, 1934

1,947,024

UNITED STATES PATENT OFFICE 1,947,024

CHEMICAL TREATMENT OF FABRICS

Edgar A. Slagle, Cranford, N. J., assignor to American Smelting and Refining Company, New York, N. Y., a corporation of New Jersey No Drawing. Application January 22, 1930
Serial No. 422,676

5 Claims. (Cl. 91—68)

This invention relates to the treatment of fabrics, and more particularly to the chemical treatment of woolen fabric to increase its resistance to heat, moisture and destructive gases.

The invention is particularly applicable to treatment of woolen fume bags which are required to withstand a temperature of 95° to 110° C. and are subjected to vigorous mechanical shaking to dislodge the fume therein. The high temperature precludes the use of organic materials and the mechanical conditions require that the chemical treatment must not impair the strength or elasticity of the fabric.

A woolen fume bag is commonly required to filter from one-half to two square feet of gas per minute per square foot of surface. It is apparent, therefore, that the chemical treatment must not impair the porosity of the fabric and its permeability to air currents. Furthermore, the gas may contain a substantial percentage of sulphur dioxide, sulphuric acid, water vapor and other products of roasting which vary with the particular process with which they are employed. The material with which the bag is treated must accordingly be such that no reaction is obtained in the presence of the above mentioned materials.

The present invention accordingly provides a protective coating for wool fabric which will preserve the original structure thereof, which will not impair the fabric as a fume filter, which increases the resistance of the fiber to heat, destructive gases and moisture, and which increases the strength and elasticity of the fiber.

The invention further consists in the new and novel features of operation and the new and original arrangements and combinations of steps in the process hereinafter described and more particularly set forth in the claims.

Although the novel features which are believed to be characteristic of this invention will be particularly pointed out in the claims appended hereto, the invention itself, as to its objects and advantages, the mode of its operation and the manner of its organization may be better understood by referring to the following description in which a particular commercial embodiment thereof is disclosed. It will be understood, however, that the processes and the steps thereof may be modified in various respects without departing from the broad spirit and scope of the invention.

In the following description and in the claims the various steps in the process and the details comprising the invention will be identified by specific names for convenience but they are intended to be as generic in their application as the art will permit.

As a particular embodiment of this invention, it will be described as applied to the treatment of woolen fume bags which are used for metallurgical purposes. These bags are treated with a colloid solution of a metallic salt which is capable of forming a resin-like material upon removal of the dispersing medium. As a specific example, a colloid solution of barium sulphate may be employed which may be obtained by dissolving barium acetate in a mixture of water and alcohol and pouring into this solution an equivalent molecular amount of sulphuric acid dissolved in a mixture of water and alcohol. The mixing of the solutions must take place rapidly so that the period during which the proportions correspond to the optimum of coagulation is maintained as short as possible. A complete colloid solution of barium sulphate having a concentration of five or six per cent is satisfactory for treating wool.

Upon drying fabric which is treated with this solution the sol shrinks and the scales of the wool are almost completely changed by an action which extends to the center of the fabric. This gives the fabric an increased strength and an increased resistance to heat destructive gases.

As a specific example, a woolen fume bag which has been treated as above and dried at 105° C. showed an increase in strength over an untreated bag of 26% and an increase in elasticity of 27.7%. After subjecting the bag to a temperature of 150° C. for 88 hours it had a strength of 40% greater and elasticity 25% greater than an untreated bag subjected to the same conditions. After subjecting it to a temperature of 150° C. in an atmosphere saturated with sulphur dioxide for 54 hours the strength and elasticity were 84% and 105%, respectively, greater than an untreated bag subjected to the same conditions. The capillarity of the treated fabric was found to be practically destroyed and its ability to absorb moisture from air was reduced 44%.

As a possible explanation of the reaction by reason of which the wool adsorbs and absorbs certain finely divided inorganic precipitates in increasing quantities as the size of these precipitated particles approaches colloid dimensions, it may be noted that the positively charged barium sulphate micella penetrate the wool capillaries causing a stream potential which drives them against the walls of the capillaries where they are coagulated by an opposite charge on the wool fiber. Approximately 15% of barium sulphate, based on the weight of the cloth, may be taken up in this way and deposited in the capillary spaces and adsorbed on the surface. When this alcohol sol is evaporated to dryness a translucent resin-like substance is obtained which can again be completely dispersed in water. The barium sulphate penetrates the wool fiber with such uniformity that the ash remaining preserves the form of the original fibers.

The above process is applicable to the treatment of new woolen fume bags and also for the reconditioning of used bags which have deteriorated in strength and elasticity. It is obvious also that other colloidal salts can be prepared which on evaporation yield a translucent resin-like material.

In the above process the colloid has been stabilized by alcohol. It may, however, be stabilized or peptized by protective colloids such as gelatin or gum arabic at the proper hydrogen ion concentration.

The above invention is not to be limited in accordance with the theory of operation which has been set out herein as a possible explanation of the chemical and mechanical reactions involved. Furthermore, the particular colloid employed may be varied by the use of other well known chemical equivalents.

Although certain novel features of the invention have been shown and described and are pointed out in the annexed claims, it will be understood that various omissions, substitutions and changes in the several steps of the process and in its operation may be made by those skilled in the art without departing from the spirit of the invention.

What is claimed is:

1. The process of treating a woolen fabric which comprises immersing the fabric in a previously formed colloidal alcohol sol of a metallic sulphate and evaporating said sol to dryness.

2. The process of treating woolen fabric which comprises subecting said fabric to a colloidal solution of barium sulphate.

3. The process of treating fabric which comprises subjecting said fabric to a solution formed by dissolving barium acetate in a mixture of water and alcohol and pouring into this mixture an equivalent molecular amount of sulphuric acid dissolved in a mixture of water and alcohol.

4. The process of treating fabrics which comprises applying thereto a previously formed alcohol sol of a barium salt and evaporating said sol to dryness.

5. The process of treating a woolen fume bag which comprises applying previously formed colloidal barium sulphate thereto and causing a coating of barium sulphate to be deposited on the various fibers.

EDGAR A. SLAGLE.